United States Patent
Hideta et al.

(10) Patent No.: US 9,527,181 B2
(45) Date of Patent: Dec. 27, 2016

(54) ATTACHMENT FOR DUST COLLECTION FOR CUTTING MACHINING, DUST COLLECTING DUCT FOR MACHINE TOOLS, TOOL HOLDER FOR MACHINE TOOLS, AND MACHINE TOOL

(71) Applicants: Mori Seiki Co., Ltd., Yamatokoriyama-shi, Nara (JP); Fuji Jukogyo Kabushiki Kaisha, Tokyo (JP)

(72) Inventors: Morihiro Hideta, Nara (JP); Koji Sato, Nara (JP); Hisayuki Oode, Tokyo (JP); Shinya Matsuo, Tokyo (JP); Tatsuo Nakahata, Tokyo (JP)

(73) Assignees: FUJI JUKOGYO KABUSHIKI KAISHA, Tokyo (JP); DMG MORI SEIKI CO., LTD., Yamatokoriyama-Shi, Nara (JP)

( * ) Notice: Subject to any disclaimer, the term of this patent is extended or adjusted under 35 U.S.C. 154(b) by 737 days.

(21) Appl. No.: 13/892,809

(22) Filed: May 13, 2013

(65) Prior Publication Data

US 2013/0312991 A1    Nov. 28, 2013

(30) Foreign Application Priority Data

May 25, 2012 (JP) ................................. 2012-119149

(51) Int. Cl.
*B23Q 11/00* (2006.01)
*B23Q 11/08* (2006.01)

(52) U.S. Cl.
CPC ....... *B23Q 11/0042* (2013.01); *B23Q 11/0046* (2013.01); *B23Q 11/0891* (2013.01); *Y02P 70/171* (2015.11)

(58) Field of Classification Search
CPC ............................ B23B 47/34; B23Q 11/0042
USPC .................... 173/197, 198, 199; 408/67, 336
See application file for complete search history.

(56) References Cited

U.S. PATENT DOCUMENTS

| | | | | |
|---|---|---|---|---|
| 2,343,875 A | * | 3/1944 | Schwartz | B23Q 1/70 144/251.2 |
| 4,037,982 A | * | 7/1977 | Clement | B23Q 11/006 408/110 |
| 4,200,417 A | | 4/1980 | Hager et al. | |
| 4,742,855 A | * | 5/1988 | Hartley | B23Q 5/10 144/154.5 |

(Continued)

FOREIGN PATENT DOCUMENTS

| | | |
|---|---|---|
| CN | 200957509 Y | 10/2007 |
| CN | 201702450 U | 1/2011 |

(Continued)

OTHER PUBLICATIONS

Extended European Search Report dated Sep. 24, 2013 for Application No. EP 13 16 5296.8.

(Continued)

*Primary Examiner* — Nathaniel Chukwurah
(74) *Attorney, Agent, or Firm* — Smith, Gambrell & Russell, LLP

(57) ABSTRACT

An attachment for dust collection for cutting machining includes a rotation mechanism and a dust collection enclosure for enclosing at least part of a tool. The dust collection enclosure is rotatably configured by being fixed to the rotation mechanism. A gap for checking a machining state is provided in the dust collection enclosure.

14 Claims, 6 Drawing Sheets

(56) References Cited

U.S. PATENT DOCUMENTS

| | | | | |
|---|---|---|---|---|
| 5,017,060 A | * | 5/1991 | Shiratori | B23C 5/2269 407/1 |
| 5,031,678 A | * | 7/1991 | Remmele | B23Q 11/0046 144/252.1 |
| 5,632,579 A | * | 5/1997 | Susnjara | B23Q 11/0046 408/67 |
| 5,988,954 A | * | 11/1999 | Gaskin | B23Q 11/0046 408/67 |
| 6,079,078 A | * | 6/2000 | Byington | B23Q 11/0046 144/252.1 |
| 7,290,967 B2 | * | 11/2007 | Steimel | B23Q 11/0046 144/252.1 |
| 7,386,911 B2 | * | 6/2008 | Stoll | A46B 13/008 15/160 |

FOREIGN PATENT DOCUMENTS

| | | |
|---|---|---|
| DE | 299 07 571 U1 | 7/1999 |
| DE | 10 2007 03085 | 2/2008 |
| EP | 0 305 616 A1 | 3/1989 |
| EP | 1 704 959 A1 | 9/2006 |
| FR | 2 386 362 A1 | 11/1978 |
| JP | S58-079306 | 5/1983 |
| JP | H05-12058 | 2/1993 |
| JP | 7-195251 | 8/1995 |
| JP | 2008-207288 | 9/2008 |

OTHER PUBLICATIONS

Chinese Office Action issued Mar. 13, 2015, for Application No. 201310198405.6 (8 pages).

European Office Action dated Jul. 14, 2014 for Application No. EP 13 16 5296.8.

First Japanese Office Action issued Dec. 21, 2015 in Patent Application No. 2012-119149 (in Japanese with English machine translation) 9 pages.

* cited by examiner

ATTACHMENT FOR DUST COLLECTION FOR CUTTING MACHINING, DUST COLLECTING DUCT FOR MACHINE TOOLS, TOOL HOLDER FOR MACHINE TOOLS, AND MACHINE TOOL

CROSS-REFERENCE TO RELATED APPLICATIONS

The present application claims priority from Japanese Patent Application No. 2012-119149 filed on May 25, 2012, the entire contents of which are hereby incorporated by reference.

BACKGROUND OF THE INVENTION

1. Field of the Invention

The present invention relates to an attachment for dust collection for cutting machining, a dust collecting duct for machine tools, a tool holder for machine tools, and a machine tool.

2. Description of the Related Art

Dust collection devices for chips are conventionally used in cutting machining where tools such as end mills or the like are utilized. For instance, technologies have been proposed (Japanese Unexamined Patent Application Publication No. H7-195251) in which a spindle head of a machine tool is provided with a dust collection device having a structure that surrounds an end mill.

However, conventional chip dust collection devices have a structure in which the periphery of a tool is covered, in order to enhance dust collection efficiency. This is problematic in that, as a result, the machining state of the workpiece cannot be checked during cutting machining. In cases where the workpiece is a composite material such as carbon fiber reinforced plastic (CFRP), in particular, keeping a sufficiently low pressure around the cut section is important, in order to achieve good dust collection.

Composite materials are superior to metallic materials such as iron or aluminum as regards specific strength and specific rigidity, but, on the other hand, are well-known as difficult-to-cut materials. Being able to check the machining state during cutting machining of composite materials would accordingly be a desirable feature. Workability for the user can likewise be expected to improve if the machining state can be checked also in machining of materials other than composite materials.

SUMMARY OF THE INVENTION

The present invention has been designed in consideration of the circumstances described above, an object thereof is to provide an attachment for dust collection for cutting machining, a dust collecting duct for machine tools, a tool holder for machine tools and a machine tool that enable checking the machining state while chip dust collection is performed satisfactorily, during cutting machining that accompanies a relative feeding operation of a tool with respect to a workpiece.

An aspect of the present invention provides an attachment for dust collection for cutting machining. The attachment includes a rotation mechanism and a dust collection enclosure for enclosing at least part of a tool. The dust collection enclosure is rotatably configured by being fixed to the rotation mechanism. A gap for checking the machining state is provided in the dust collection enclosure.

Another aspect of the present invention provides a dust collecting duct for machine tools. The dust collecting duct for machine tools includes the attachment for dust collection and a flow channel of air for dust collection. The flow channel of air for dust collection is coupled to the rotation mechanism of the attachment for dust collection.

Another aspect of the present invention provides a tool holder for machine tools. The tool holder for machine tools includes the dust collecting duct and a holder section for holding a tool and for being attached to a rotating shaft of a machine tool. The dust collecting duct is removably coupled to the holder section.

Another aspect of the present invention provides a machine tool. The machine tool includes the dust collecting duct and a driving mechanism. The driving mechanism, to which the dust collecting duct is coupled, relatively displaces a tool with respect to the workpiece while rotating the tool.

DESCRIPTION OF THE PREFERRED EMBODIMENTS

An explanation follows next, with reference to accompanying drawings, on an attachment for dust collection for cutting machining, a dust collecting duct for machine tools, a tool holder for machine tools and a machine tool according to an embodiment of the present invention.

(First Embodiment)

Figure 1:
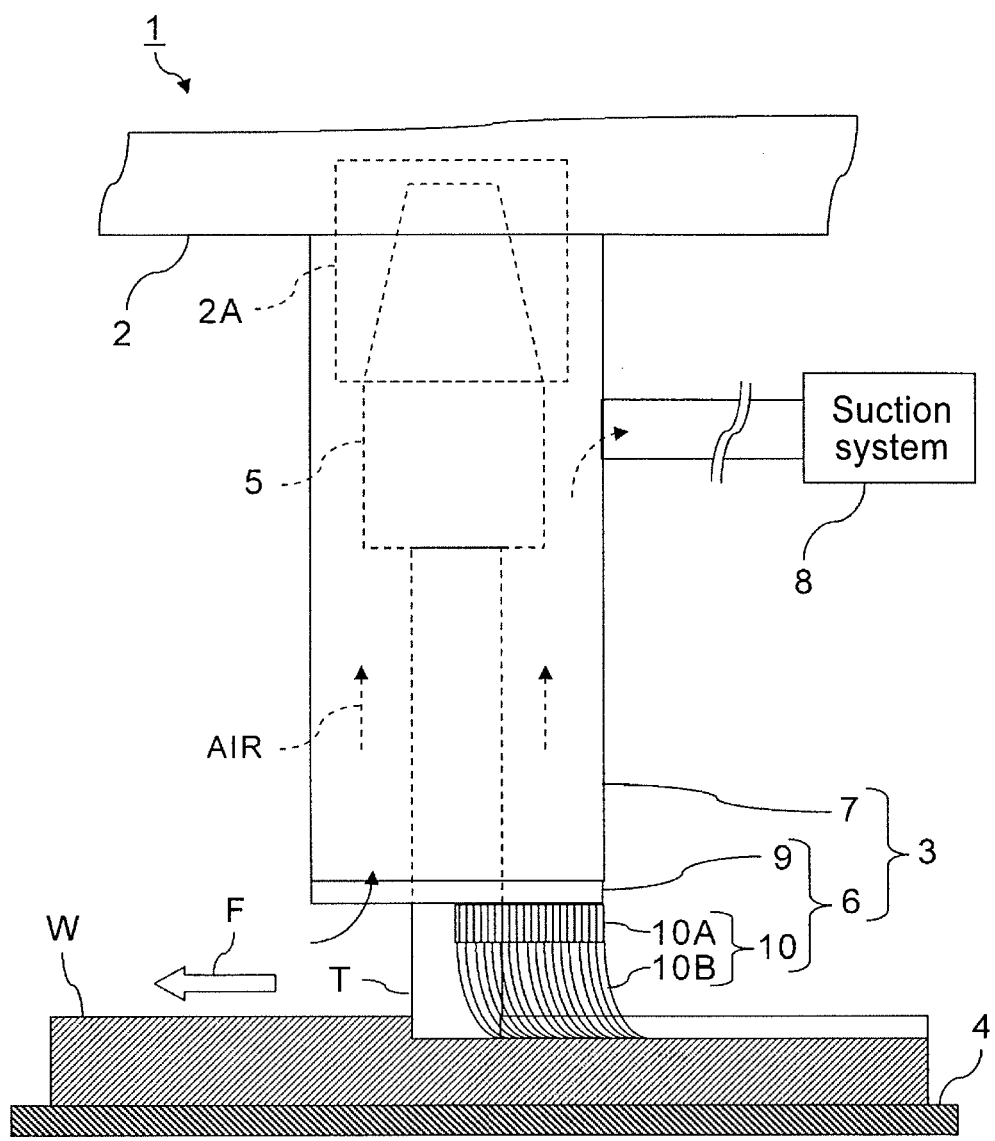
FIG. 1 is a front-view diagram illustrating the configuration of an attachment for dust collection for cutting machining, a dust collecting duct for machine tools and a machine tool according to a first embodiment of the present invention.
Figure 2:
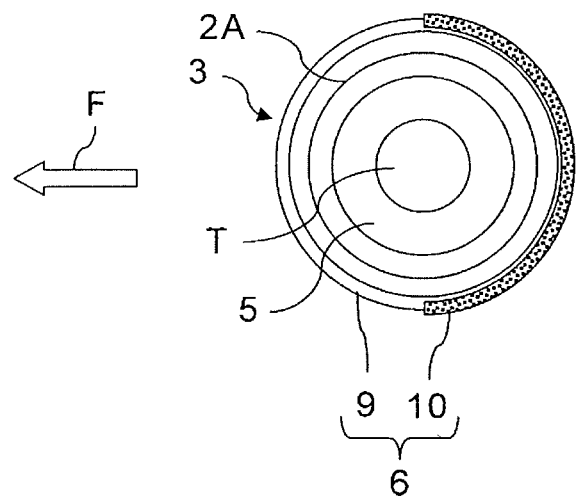
FIG. 2 is a bottom-view diagram of a dust collecting duct illustrated in FIG. 1.

FIG. 1 is a front-view diagram illustrating the configuration of an attachment for dust collection for cutting machining, a dust collecting duct for machine tools and a machine tool according to a first embodiment of the present invention. FIG. 2 is a bottom-view diagram of a dust collecting duct 3 illustrated in FIG. 1.

A machine tool 1 is configured through coupling of the dust collecting duct 3 to a driving mechanism 2. The machine tool 1 includes a table 4 for setting a workpiece W of a composite material, a metal or the like. The driving mechanism 2 is a device for displacing a tool T relatively to the workpiece W, in a feeding direction F, while rotating the tool T. To that end, the driving mechanism 2 is provided with a spindle 2A for rotating the tool T, by way of a tool holder 5. The table 4 for setting the workpiece W may also be displaced instead of, or in addition to, displacement of the tool T.

Accordingly, the dust collecting duct 3 can be coupled to the driving mechanism of not only a machine tool such as a machining center, a milling machine or the like in which one or both of the spindle 2A and the table 4 move, but also of a machine tool such as a drilling machines and a boring machine where the table 4 can be displaced relatively with respect to the tool axis.

The dust collecting duct 3 is configured through coupling of an attachment for dust collection 6 to a flow channel of air for dust collection 7. The dust collecting duct 3 is a duct for collection of chips, by way of air for dust collection that is generated in a suction system 8. Accordingly, an outlet of the flow channel 7 is connected to the suction system 8.

The attachment for dust collection 6 has a rotation mechanism 9 and a dust collection enclosure 10. The rotation mechanism 9 has a movable section that rotates in the rotation direction of the tool T, and a non-movable section that does not rotate. The non-rotating side (fixed side) of the rotation mechanism 9 of the attachment for dust collection 6 is fixed to the flow channel of air for dust collection 7.

The rotation direction of the movable section of the rotation mechanism 9 may be set to a direction dissimilar from the rotation direction of the tool T, in accordance with the relative positional relationship between the workpiece W and the tool T. Preferably, the rotation mechanism 9 is configured in such a manner that the movable section rotates on a plane that is substantially parallel to the feeding direction F of the tool T along the surface of the workpiece W.

The dust collection enclosure 10 is fixed to the movable section of the rotation mechanism 9. Therefore, the dust collection enclosure 10 is rotatably configured by becoming integrated with the movable section of the rotation mechanism 9. Accordingly, a bearing can be used in the rotation mechanism 9. Any mechanism, for instance a mechanism provided with a rolling element that rolls along a circular rail, can be used as the rotation mechanism 9, so long as the mechanism allows the entire dust collection enclosure 10 to rotate.

The dust collection enclosure 10 is an enclosure for securing the pressure of air for dust collection, by enclosing the tool T. A gap for checking the machining state is provided in the interior of the dust collection enclosure 10. Therefore, at least part of the tool T is enclosed by the dust collection enclosure 10.

Preferably, the shape of the dust collection enclosure 10 is set to a shape such that the dust collection enclosure 10 rotates together with the rotation mechanism 9, in a direction corresponding to the relative displacement direction with respect to the workpiece W, in a case where the feeding operation involves contact with the workpiece W. Therefore, the shape of the dust collection enclosure 10 can be set to the shape of part of a cylinder.

In a more specific example, the shape of the dust collection enclosure 10 can be set to a shape in which part of a side face of a tubular structure is cut, or to a tubular shape of non-constant height. FIG. 1 illustrates an example in which the shape of the dust collection enclosure 10 is set to a shape resulting from cutting a cylinder shape in a plane parallel to the axial direction of the cylinder. If the cylinder shape is set to a shape resulting from cutting into halves along a plane that passes through the axis of the cylinder, then the resulting open side can be used as the gap for checking the machining state, as illustrated in FIG. 1.

The material of the dust collection enclosure 10 is a material having enough pliability so as to flex when the dust collection enclosure 10 comes into contact with the workpiece W. Accordingly, the dust collection enclosure 10 can be configured out of any material such as rubber, a resin material or the like. In particular, the dust collection enclosure 10 can be configured out of a brush-like material, such as a resin or the like, as illustrated in FIG. 1. In this case, it becomes possible to sufficiently avoid damage to the workpiece W when the dust collection enclosure 10 comes into contact with the workpiece W.

Further, the dust collection enclosure 10 can be made up of a first portion 10A, on the rotation mechanism 9 side, and a second portion 10B that constitutes the workpiece W side. The first portion 10A has a first strength. The second portion 10B has a second strength. The second strength is set to be smaller than the first strength.

That is, the strength on the rotation mechanism 9 side can be increased relatively, and the strength on the workpiece W side can be reduced relatively. The dust collection enclosure 10 may be configured out of a plurality of portions having three or more mutually dissimilar strengths.

When the dust collection enclosure 10 is configured out of a plurality of portions having mutually dissimilar strengths, the portion of large strength on the rotation mechanism 9 side functions mainly as a site at which a rotational force can be transmitted satisfactorily to the rotation mechanism 9. Conversely, the portion of small strength on the workpiece W side affords mainly good adhesion to the workpiece W side, and functions as a portion that curtails increases in pressure inside the dust collection enclosure 10. Therefore, it becomes possible to increase the suction force for dust collection while generating sufficient rotational force for causing the dust collection enclosure 10 to rotate.

The plurality of portions that make up the dust collection enclosure 10 can include a plurality of materials having mutually dissimilar strengths, but materials can be shared across the portions. For instance, the first portion 10A can be formed easily by fixing the rotation mechanism 9 side of the brush-like dust collection enclosure 10 using a silicon resin (silicone).

The dust collection enclosure 10 can adopt various shapes other than the shape exemplified in FIG. 1. For instance, the dust collection enclosure 10 may be set to have a shape in which part of a side face of a tubular structure is cut, or a tubular shape of non-constant height. Specifically, the shape of the dust collection enclosure 10 may be such that both ends are shorter than at other portions, and the center is longer than other portions. In this case, a rotational force can be better achieved if the feeding operation is performed with the dust collection enclosure 10 in contact with the workpiece W, as compared with a case where the shape has a constant height, as illustrated in FIG. 1.

The structure of the dust collection enclosure 10 is not limited to a brush-like structure, and various structures may be resorted to in the dust collection enclosure 10.

Figure 3:
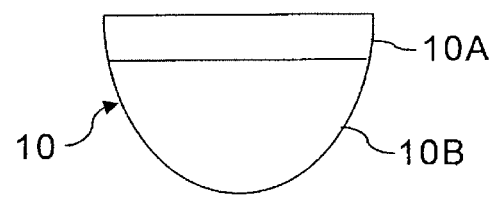
FIG. 3 is a structural diagram illustrating a first variation of a dust collection enclosure illustrated in FIG. 1.
Figure 4:
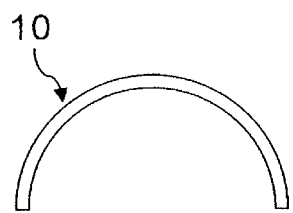
FIG. 4 is a bottom-view diagram of the dust collection enclosure illustrated in FIG. 3.

FIG. 3 is a structure diagram illustrating a first variation of the dust collection enclosure 10 illustrated in FIG. 1, and FIG. 4 is a bottom-view diagram of the dust collection enclosure 10 illustrated in FIG. 3.

As illustrated in FIG. 3 and FIG. 4, it is possible to configure an integrated dust collection enclosure 10, having no breaks, by using an elastic material such as rubber or a soft material such as a resin. In the example illustrated in FIG. 3 and FIG. 4, the shape of the dust collection enclosure 10 is a non-cylindrical shape of non-constant height.

Figure 5:
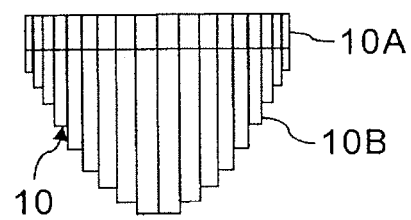
FIG. 5 is a structural diagram illustrating a second variation of the dust collection enclosure illustrated in FIG. 1.
Figure 6:
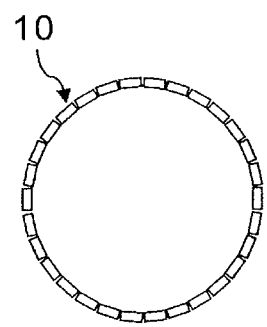
FIG. 6 is a bottom-view diagram of the dust collection enclosure illustrated in FIG. 5.

FIG. 5 is a structure diagram illustrating a second variation of the dust collection enclosure 10 illustrated in FIG. 1, and FIG. 6 is a bottom-view diagram of the dust collection enclosure 10 illustrated in FIG. 5.

As illustrated in FIG. 5 and FIG. 6, it is possible to configure a strip-type dust collection enclosure 10 by making cuts into an elastic material such as rubber or a soft material such as a resin. In the example illustrated in FIG. 5 and FIG. 6, the shape of the dust collection enclosure 10 is a cylindrical shape of non-constant height.

The outlet of the dust collecting duct 3 that has, as a constituent element, the dust collection enclosure 10 having such a shape and structure, is connected to the suction system 8. Therefore, the dust collection enclosure 10 side of the dust collecting duct 3 constitutes a suction port of the chips that are generated upon cutting machining of the workpiece W. A chip dust collection system is formed thus by the dust collecting duct 3 that is provided with the dust collection enclosure 10 and by the suction system 8.

Undesirable occurrences may arise, in which chips penetrate into a gap of the rotation mechanism 9, in cases where a component having gaps, for instance a bearing or the like, is used as the rotation mechanism 9. Accordingly, a shield member can be provided that prevents intrusion of chips into the gaps of the rotation mechanism 9.

Figure 7:
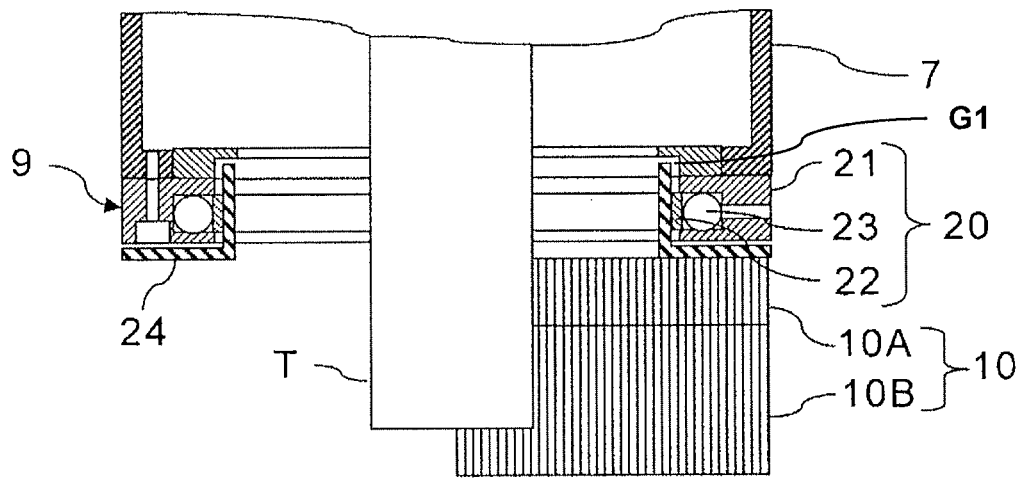
FIG. 7 is a vertical cross-sectional diagram illustrating a first structure example of a shield member and a bearing used as a rotation mechanism illustrated in FIG. 1.

FIG. 7 is a vertical cross-sectional diagram illustrating a first structure example of a shield member and the bearing used as the rotation mechanism 9 illustrated in FIG. 1.

FIG. 7 illustrates an example in which a ball bearing 20 is used as the rotation mechanism 9. The ball bearing 20 is configured by sandwiching a plurality of spherical rolling elements 23 between an outer ring 21 and an inner ring 22. In a case where the ball bearing 20 is used as the rotation mechanism 9, the outer ring 21 side of the ball bearing 20 can be fixed to the flow channel of air for dust collection 7, and the dust collection enclosure 10 can be fixed to the inner ring 22 side of the ball bearing 20, as illustrated in FIG. 7.

In this case, there can be provided a shield member 24 that covers gaps such as screw holes and the gap G1 formed between the outer ring 21 and the inner ring 22. Intrusion of chips into the gaps of the ball bearing 20 can be thus prevented by the shield member 24. The shield member 24 allows also supporting smooth rotation of the dust collection enclosure 10.

FIG. 7 illustrates an example in which a ring-shaped shield member 24 having an L-shaped longitudinal section is provided between the inner ring 22 and the dust collection enclosure 10. In this case, the dust collection enclosure 10 is indirectly coupled to the inner ring 22 of the ball bearing 20 by way of the shield member 24.

Figure 8:
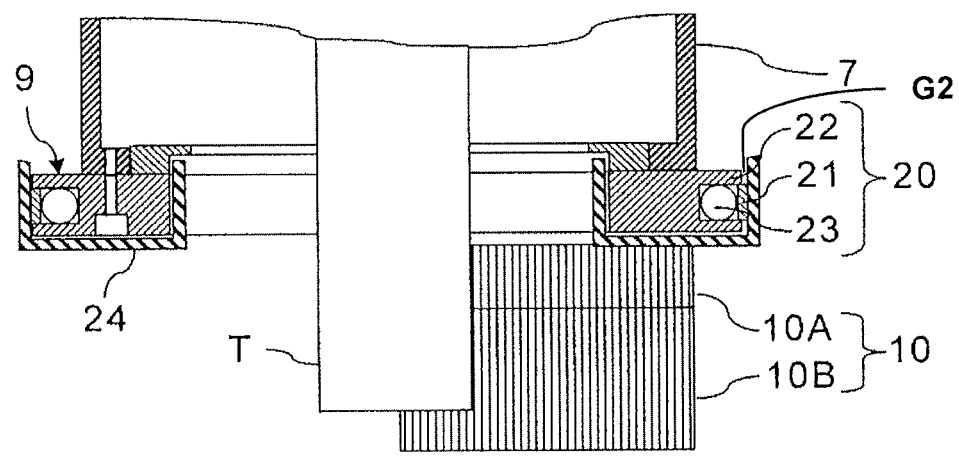
FIG. 8 is a vertical cross-sectional diagram illustrating a second structure example of a shield member and a bearing used as the rotation mechanism illustrated in FIG. 1.

FIG. 8 is a diagram illustrating a second structure example of the shield member and the bearing used as the rotation mechanism 9 illustrated in FIG. 1.

FIG. 8 illustrates an example in which the inner ring 22 side of the ball bearing 20 is fixed to the flow channel of air for dust collection 7, and the dust collection enclosure 10 is fixed to the outer ring 21 side of the ball bearing 20. In this case, a ring-shaped shield member 24 having a C-shaped longitudinal section can be provided between the ball bearing 20 and the dust collection enclosure 10.

In this case, the dust collection enclosure 10 is indirectly coupled to outer ring 21 of the ball bearing 20 by way of the shield member 24. Therefore, a gap G2 is provided between the shield member 24 and the inner ring 22. The shield member 24 serves also as a coupling component of the dust collection enclosure 10 to the ball bearing 20.

The function of the attachment for dust collection 6 is explained next.

The dust collection enclosure 10 is configured to be rotatable, by 360 degrees, by the rotation mechanism 9 such as a bearing. Accordingly, the dust collection enclosure 10 can be brought to a rotation position, as desired beforehand, when the tool T is displaced in the feeding direction F by the driving mechanism 2 of the machine tool 1, in a state where the leading end of the dust collection enclosure 10 is not in contact with the workpiece W. As a result, it becomes possible to view the machining state inside, from a desired direction, by way of the gap for checking the machining state.

By contrast, when the tool T is displaced in the feeding direction F by the driving mechanism 2 of the machine tool 1 in a state where the leading end of the dust collection enclosure 10 is in contact with the workpiece W, the dust collection enclosure 10 rotates on account of interactions, for instance frictional forces, between the workpiece W and the dust collection enclosure 10. The position of the center of gravity of the dust collection enclosure 10 lies on the opposite side in the feeding direction F. That is, the central section of the dust collection enclosure 10 is at the rear with respect to the cutting direction, as illustrated in FIG. 1. As a result, it becomes possible to view the machining state of the workpiece W through the opening portion of the dust collection enclosure 10 that faces the travel direction side of the tool T.

Pressure in the vicinity of the cut section is sufficiently lowered by the dust collection enclosure 10. As a result, chips generated upon cutting can be satisfactorily collected, via the dust collecting duct 3, by virtue of the suction force derived from the operation of the suction system 8.

Figure 9:
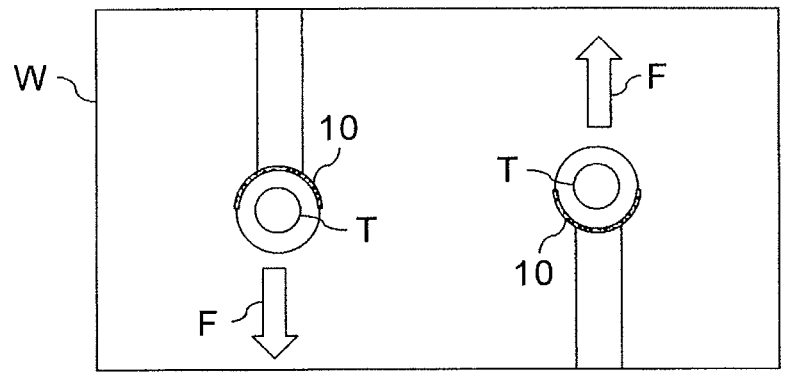
FIG. 9 is a diagram illustrating a rotation position of a dust collection enclosure in a case where a top face of a workpiece is cut using the machine tool illustrated in FIG. 1.

FIG. 9 is a diagram illustrating the rotation position of the dust collection enclosure 10 in a case where the top face of the workpiece W is cut using the machine tool 1 illustrated in FIG. 1.

The soft leading end portion of the dust collection enclosure 10 can be caused to contact-slide over the top face of the workpiece W in a case where the top face of the workpiece W is cut, as in engraving machining. As a result, the dust collection enclosure 10 rotates together with the movable section of the rotation mechanism 9. The dust collection enclosure 10 lies at all times at the rear with respect to the travel direction of the tool T. As a result, it becomes possible to view the machining state of the workpiece W through the gap of the dust collection enclosure 10 that faces the travel direction side of the tool T. The chips generated upon cutting of the workpiece W are collected, in a particularly satisfactory manner, at the rear of the tool T.

Figure 10:
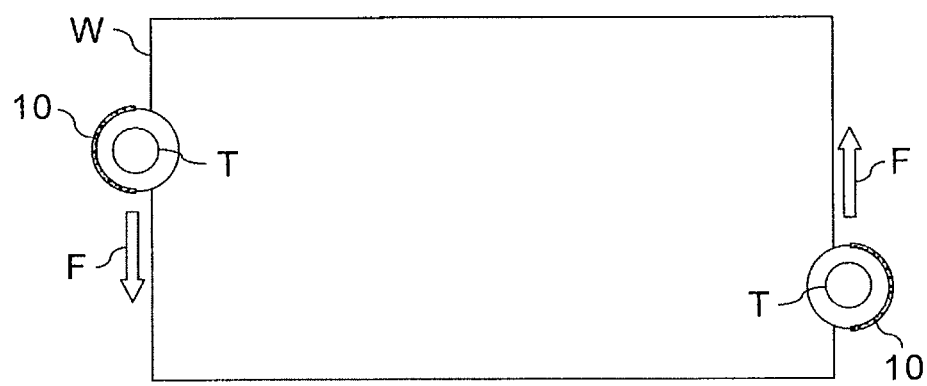
FIG. 10 is a diagram illustrating a rotation position of a dust collection enclosure in a case where a side face of a workpiece is cut using the machine tool illustrated in FIG. 1.

FIG. 10 is a diagram illustrating the rotation position of the dust collection enclosure 10 in a case where a side face of the workpiece W is cut using the machine tool 1 illustrated in FIG. 1.

The soft leading-end portion of the dust collection enclosure 10 can be caused to contact-slide over the side face of the workpiece W in a case where a side face of the workpiece W is cut, as in trim machining. As a result, the dust collection enclosure 10 rotates together with the movable section of the rotation mechanism 9. The dust collection enclosure 10 is at all times on the side opposite to the machined surface of the workpiece W. Accordingly, it becomes possible to view the machining state of the workpiece W through the gap of the dust collection enclosure 10 that faces the machined surface side. The chips generated upon cutting of the workpiece W are collected, in a particularly satisfactory manner, at the side opposite the machined surface.

That is, an attachment for dust collection 6 such as the above-described one attaches the rotation mechanism 9 to the dust collection enclosure 10 that is provided with the gap for checking the machining state. As a result, it becomes possible to increase the chip dust collection efficiency while securing visibility of the machining state. In particular, sufficient dust collection by way of a duct for dust collection alone was difficult in the case of chips generated in trim machining of a composite material such as CFRP. However, sufficient dust collection can be achieved by providing the dust collection enclosure 10. Also, it becomes possible to secure both visibility of the machining state and dust collection efficiency in various kinds of cutting machining of diverse materials.

Moreover, the orientation of the dust collection enclosure 10 can be caused to track the travel direction of the tool T by tweaking the shape of the dust collection enclosure 10. That is, the gap for checking the machining state can be aimed constantly forward in the feeding direction F of the tool T during cutting machining.

(Second Embodiment)

Figure 11:
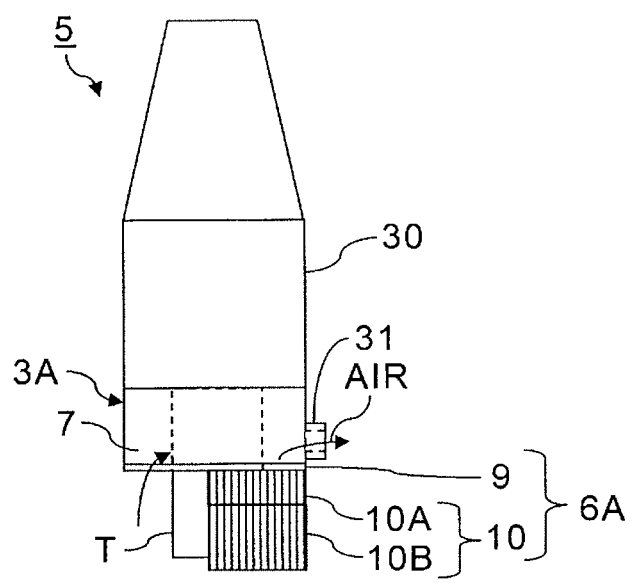
FIG. 11 is a configuration diagram of a tool holder for machine tools that includes a dust collecting duct, and an attachment for dust collection for cutting machining, according to a second embodiment of the present invention.

FIG. 11 is a configuration diagram of a tool holder for machine tools that includes a dust collecting duct, and an attachment for dust collection for cutting machining, according to a second embodiment of the present invention.

A dust collecting duct 3A that includes an attachment for dust collection 6A illustrated in FIG. 11 differs from the attachment for dust collection 6 and the dust collecting duct 3 illustrated in FIG. 1 in that the dust collecting duct 3A comprising an attachment for dust collection 6A is removably attached not to the machine tool 1 but to the tool holder 5. Other features and effects are substantially no different from those of the attachment for dust collection 6 and the dust collecting duct 3 illustrated in FIG. 1, and hence only the tool holder 5 will be illustrated. Identical features will be denoted by identical reference numerals, and an explanation thereof will be omitted.

The tool holder 5 is configured in such a manner that the dust collecting duct 3A can be removably coupled to a holder section 30. The holder section 30 has a structure such that the holder section 30 holds the tool T and can be removably attached to the rotating shaft of the machine tool 1. As a result, the dust collecting duct 3A can be attached indirectly to the machine tool 1 through attachment of the holder section 30 to the rotating shaft of the machine tool 1.

A discharge port 31 that constitutes the dust collection port for discharge of chips out of the dust collecting duct 3A can be provided in such a manner that the discharge direction of the chips is oriented perpendicularly to the central axis of the tool T. In this case, the orientation of the discharge port 31 from the dust collecting duct 3A is a tangent of the rotation direction of the tool T. Accordingly, the chip dust collection efficiency can be enhanced by providing the discharge port 31, which faces the suction system, in the vicinity of the tool T. That is, the flow of air that accompanies rotation of the tool T can be exploited for dust collection.

Such a tool holder 5 of the second embodiment makes for a compact size of the dust collecting duct 3A. As a result, the dust collection efficiency can be further enhanced by narrowing the area targeted for dust collection.

In the second embodiment, the dust collecting duct 3A may be formed integrally, i.e. not removably, with the tool holder 5.

(Other Embodiments)

Specific embodiments have been described above, but the embodiments are merely exemplary in nature, and are not meant to limit the scope of the invention in any way. The novel method and device disclosed herein can be embodied in various other forms. The forms of the method and device disclosed herein can accommodate various omissions, substitutions and modifications without departing from the scope of the invention. These diverse forms and variations are included in the appended claims and equivalents thereof, which encompass the scope and gist of the invention.

What is claimed is:

1. An attachment for dust collection for cutting machining, comprising:
    a rotation mechanism; and a dust collection enclosure, rotatably configured by being fixed to the rotation mechanism, for enclosing at least part of a tool, wherein a gap for checking a machining state is provided in the dust collection enclosure, and the dust collection enclosure has a shape such that the gap faces a travel direction side of the tool, due to the dust collection enclosure rotating together with the rotation mechanism, by a frictional force between a workpiece and the dust collection enclosure, when the dust collection enclosure contacts a top face of the workpiece during a feeding operation.

2. The attachment for dust collection for cutting machining according to claim 1, wherein the dust collection enclosure has
    a first portion on a rotation mechanism side, having a first strength, and
    a second portion that constitutes a workpiece side, having a second strength smaller than the first strength.

3. The attachment for dust collection for cutting machining according to claim 1, wherein a shield member is provided for preventing intrusion of chips into a gap of a bearing that is used as the rotation mechanism.

4. The attachment for dust collection for cutting machining according to claim 1, wherein the dust collection enclosure has a shape in which part of a side face of a tubular structure is cut, or a tubular shape of non-constant height.

5. The attachment for dust collection for cutting machining according to claim 1, wherein the dust collection enclosure comprises a brush configuration.

6. A dust collecting duct device for machine tools, comprising:
    the attachment for dust collection according to claim 1; and
    a flow channel of air for dust collection that is coupled to the rotation mechanism of the attachment for dust collection.

7. A tool holder for machine tools, comprising:
    the dust collecting duct device according to claim 6; and
    a holder section, to which the dust collecting duct device is removably coupled, for holding a tool and for being attached to a rotating shaft of a machine tool.

8. The tool holder for machine tools according to claim 7, wherein a dust collection port for discharge of chips out of the dust collecting duct device is provided in such a manner that a discharge direction of the chips is oriented perpendicularly to a central axis of the tool.

9. A machine tool device, comprising:
the dust collecting duct device according to claim 6; and
a driving mechanism, to which the dust collecting duct device is coupled, for relatively displacing a tool with respect to the workpiece while rotating the tool.

10. The machine tool device according to claim 9 further comprising the tool.

11. The machine tool device of claim 10 further comprising a power source for tool rotation that is independent of rotation of the dust collection enclosure with the rotation mechanism.

12. An attachment device for machine tool generated dust collection, comprising:
a rotation mechanism; and
a dust collection enclosure, the dust collection enclosure being secured to the rotation mechanism for rotation with the rotation mechanism, said dust collection enclosure extending, for tool visibility, only partially about a circumference extending about the rotation mechanism and only partially about the tool, and said dust collection enclosure being flexible such that upon contact with a workpiece said dust collection enclosure rotates into a tool visibility position, wherein
the dust collection enclosure is configured to rotate together with the rotation mechanism, on account of a frictional force between a workpiece and the dust collection enclosure, when a feeding operation is given to the dust collection enclosure contacting with a top face of the workpiece, such that the dust collection enclosure will not extend about a travel direction side of the circumference of the tool during the feeding operation.

13. The attachment device of claim 12 wherein the rotation mechanism is a bearing assembly with a first portion configured for attachment with a flow duct of the machine tool and a second portion fixed to the dust collection enclosure.

14. The attachment device of claim 13 further comprising a shield that is secured to both said bearing assembly and said dust collection enclosure.

* * * * *